United States Patent [19]

Spies et al.

[11] Patent Number: 5,431,440

[45] Date of Patent: Jul. 11, 1995

[54] RESTRAINT SYSTEM FOR PASSENGERS IN VEHICLES WITH OPTO-ELECTRIC TRIGGER MEANS

[75] Inventors: Hans Spies, Pfaffenhofen; Horst Daxer, Munich, both of Germany

[73] Assignee: Deutsche Aerospace AG, Munich, Germany

[21] Appl. No.: 65,856

[22] Filed: May 21, 1993

Related U.S. Application Data

[63] Continuation-in-part of Ser. No. 747,126, Aug. 19, 1991, abandoned.

[30] Foreign Application Priority Data

Aug. 23, 1990 [DE] Germany ............... 40 26 697.4

[51] Int. Cl.⁶ ............................................. B60R 21/32
[52] U.S. Cl. ............................... 280/735; 136/291; 136/293
[58] Field of Search ............... 280/734, 735, 736, 741, 280/806; 136/291, 293

[56] References Cited

U.S. PATENT DOCUMENTS

| | | | |
|---|---|---|---|
| 4,117,730 | 10/1978 | Spies et al. | 307/121 |
| 4,158,191 | 6/1979 | Rogers et al. | 280/735 |
| 4,167,276 | 9/1979 | Bell et al. | 280/731 |
| 4,209,185 | 6/1980 | St. Clair et al. | 280/734 |
| 4,552,380 | 11/1985 | Stevens | 280/728 |
| 4,568,521 | 2/1986 | Spector | 136/291 |
| 4,711,466 | 12/1987 | Breed | 280/741 |
| 4,959,603 | 9/1990 | Yamamoto et al. | 136/293 |

FOREIGN PATENT DOCUMENTS

| | | |
|---|---|---|
| 2559584A | 2/1985 | France . |
| 3518502A1 | 11/1986 | Germany . |
| 3742278A1 | 6/1989 | Germany . |
| 4026697C2 | 7/1992 | Germany . |

*Primary Examiner*—Margaret A. Focarino
*Assistant Examiner*—Paul N. Dickson
*Attorney, Agent, or Firm*—McGlew and Tuttle

[57] ABSTRACT

A vehicle's restraint system for passengers such as airbags, belt tighteners or similar devices to protect the passengers in case of a crash against injury including an electronic sensor circuit for the release of the restraint system, only upon the occurrence of predetermined conditions. An energy supply is provided for supply of the electronic sensor circuit with a proper and set voltage value to be monitored at least from time to time and compared with a reference voltage wherein at least an emergency voltage supply is to be held in a steady state such as at the set voltage value to provide power to electrically ignite a pyrotechnic or propellant charge if triggered by said electronic sensor circuit, in the case that one or more of said predetermined conditions evaluated in said electronic sensor circuit by comparing it with chosen threshold values are fulfilled, indicating that a crash event is detected by an acceleration responsive signal generator in said electronic sensor circuit. An electric cell is provided in communication with said energy supply for recharging at least the emergency source thereof to said steady state. An optical connection is provided for optical connection to said opto-electric cell including a light emitting element connected to a light receiving element via a light guide so arranged as to achieve said recharging of one of the sources being accumulateable when a light source emits light.

15 Claims, 3 Drawing Sheets

RESTRAINT SYSTEM FOR PASSENGERS IN VEHICLES WITH OPTO-ELECTRIC TRIGGER MEANS

CROSS REFERENCE TO RELATED APPLICATION

This application is a continuation-in-part of application Ser. No. 07/747,126 filed Aug. 19, 1991, now abandoned.

FIELD OF THE INVENTION

The present invention pertains to a restraint system for passengers in vehicles and more particularly to such systems employing gas generators to inflate a protective device such as a gas cushion (airbag), or to tension safety belts when a triggering signal is given.

BACKGROUND OF THE INVENTION

Depending on the particular application, i.e. which type of vehicle, a crash or collision with another vehicle or an obstacle, the direction and magnitude of a shock, the efforts to make to sufficiently protect a passenger against injuries are different, but sensing and evaluating the crash has to be done in the range of milliseconds to have enough time to inflate or to tension the a.m. restraint system. An igniting device must be activated in order to ignite a fuel charge or propellant in the gas generator when triggered.

Because electronic sensor systems could sense and evaluate quite a lot of eventualities with respect to vehicle types and types of crash, they become more and more widespread in practice. However electronic sensor systems have the disadvantage that electromagnetic waves, high- or ultra high frequencies (HF, UHF), can influence their well-functioning. An example of such influence is when a vehicle having such an electronic sensor system built into it, moves in traffic nearby a radio station, a tv station, or similar source of electronic noise and/or disturbances.

For safety reasons such electronic sensor systems in the art use an additional mechano-electrical switch, normally open, and closed only when a substantial velocity change in the vehicles move occurred, or there has been used two independent but redundant electronic sensor circuits.

SUMMARY AND OBJECTS OF THE INVENTION

It is an object of the present invention to provide a restraint system for passengers in vehicles having incorporated an electronic sensor system to avoid external influences of e.m.f. on the system, which can cause trouble as aforementioned with respect to prior art devices. A further object of the invention is to avoid the known mechano-electrical switches as widely in use in common systems. Such switching systems could cause inconveniences since they may be used only after long years of non-use.

One further object of the invention is to not only avoid for the electronic sensor electromagnetical disturbances, noise or the like, but also to avoid the danger which could arise when an igniter is activated inadvertently, as it is possible with known systems where the gas generator and its ignition means forms a unit or are together built into a car at the same time.

According to the invention, as defined within the claims, the restraint system for passengers in vehicles has a fully encapsulated electronic sensor circuit, and an opto-electric triggering means, such that both are no longer subject to influence by electromagnetical waves, HF; UHF; or similar disturbances.

Furthermore the triggering according to the invention could be made exactly under distinct predetermined conditions, i.e. at a sharply set timepoint not influenced from the exterior or environment.

Under safety aspects the invention is always powered by a proper electric energy source of exact voltage also in case of emergency. Such source is rechargeable by light, also in an all-in-one casing, in a self-contained manner, with part of the energy sources being interchangeable. The safety of the device according to the invention is further enhanced by the fact that the electrically activatable igniter cannot directly ignite the (main) charge in the gas generator.

For better understanding of the invention, its advantages, operation and specific objects attained by its uses, reference is made to the accompanying drawings and descriptive matter in which preferred embodiments of the invention are illustrated.

Persons skilled in the art are able to modify these embodiments without thereby going beyond the scope of the present invention.

Further advantages will become apparent from the following description given on the basis of the examples shown.

DETAILED DESCRIPTION OF THE PREFERRED EMBODIMENTS

Figure 1:
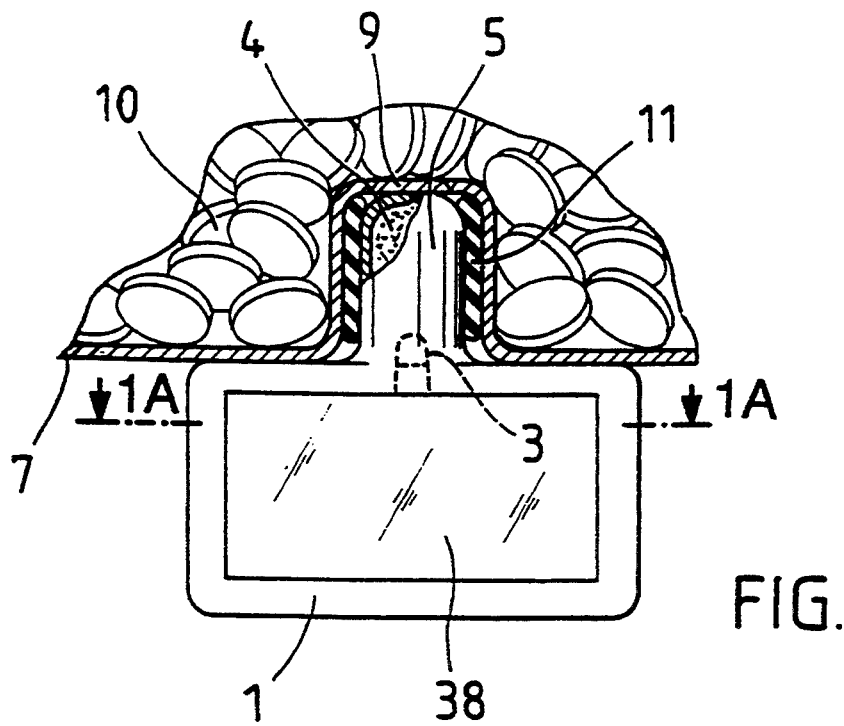
FIG. 1 is a partial sectional view showing the new protective device according to the invention.

As shown in FIG. 1, a housing 1 encapsulates a new unit including one electronic integrated circuit (IC), namely the electronic sensor circuit, on a single chip 2, and ignition means like an igniting mixture or a primer 4, to be ignited from an electric igniter 3 which is triggered from the chip 2 when predetermined conditions are fulfilled.

The electronic sensor circuit (chip 2) is the same or similar to that, described in U.S. Pat. No. 4,117,730 of the same inventor (Spies et al). U.S. Pat. No. 4,117,730 is hereby incorporated by reference. The sensor circuit (chip 2) has the purpose to release the restraint system (to release a gas cushion (airbag) or to tension a belt tightener (that is some mechanism activated by an ignitable material), but only at predetermined conditions, set by threshold values). The sensor circuit (chip 2) includes one or more electric energy sources one of which is an emergency source, for example a capacitor to be charged, storing its energy and decharged upon a signal as later on described in the description of the triggering means of this invention. One of the energy sources is used as a reference (U ref) since a set voltage is required. This is also true with respect to the emergency source (U reserve) to be held at a steady state by means of charging by light transmission thereto, receiving and converting it into electrical energy by photoelectric cell means in a recharge circuit. An acceleration responsive signal is generated from an acceleration sensor such as a piezo-electric signal generating element (see Spies et al above), able to sense in one, two or three axes (in more than one direction, if direction of crash is also being sensed). This signal is then amplified, delayed and evaluated as predetermined or preprogrammed to release or activate and restraint system only during collision situations such as a crash, but to discriminate other situations like road roughness, short blows, etc,.

From FIG. 1 it is further seen that the primer 4 is packaged into an ampoule or the like cylindrical vessel 5 which forms a prolongation of the encapsulation for chip 2 or is at least tightly connected therewith as by welding or so. Both the primer 4/vessel 5 and chip are provided as a new unit in the form of housing 1. The housing 1 can be made of plastic or metal or of a metal/plastic laminate.

The vessel 5 has a planar and a dome shaped end wall at the ends of its cylinder. The planar end wall is fixed to the encapsulation of the chip 2 and has built into it a glow wire or the like igniter 3 The glow wire 3 is electrically connected to chip 2 and connected to the outlet (signal output) of the circuit on chip 2. Other igniters than a glow plug can be used such as electric squib or other electric igniters preferred for low energy consumption and for the most exact activation achievable by electrical signal.

When ignited the burning gas of mixture or primer 4, by its developing pressure, opens the dome shaped end wall of vessel 5 at a weekend point or points at is tip. In turn, upon upon reaching a pressure difference, the gas urges open a weakened portion 9 of the cup shaped recess 8 in the wall of housing 7. Since this is a thin wall at 9 like a foil or diaphragm it is easy to open by a breaching or valve like action when a high enough pressure difference is created by burning gases of mixture or primer 4 to further ignite the main charge 10 or main solid fuel in the gas generator when the aforesaid valve like action is fulfilled.

A seal 11 thereby prevents gas exit between the housing 1 and 7. The igniter mixture or primer and the main propellant or charge 10 are both preferably of the solid fuel type as described in ATZ Automobiltechnische Zeitschrift 84 (1982), No. 2, pp. 77–78 see FIG. 4, as well as Vol. 77, No. 11, pp. 314 ff. of the same journal.

Figure 1A:
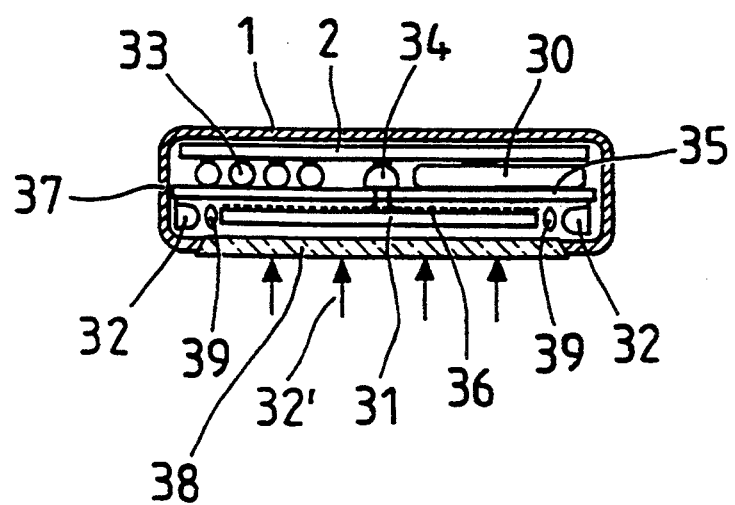
FIG. 1a is a sectional view taken along line 1a–1a of FIG. 1, showing the casing including: electronic sensor circuit on a single chip, the energy sources, the opto-electric unit.

In FIG. 1a the sectional view shows the encapsulation and electromagnetical shielding of housing 1. This is enhanced in the way that at least partially it is further encased by a casing 37 having at its opposite external wall a transparent part or window 38. This allows light to get through and into light guide means or a photoelectric cell 31. For example, a solar cell (optoelectric cell) may be applied directly or via an optical element like a lens 39 together forming a light receiving element when the at least partial transparent part is a light guide 36. Instead or in addition to global or solar light a light source of a broad wave band like one or more laser diodes (LEDs) or glow lamps can be used. Their light which enters through window 38 is guided by light guides 36 into cell 31, and then converted into electrical energy to charge one or more of the energy sources 30, 33 via charging circuit 35. An optical connection means is provided by the light guide 36 and light guide part 36' (forming light guiding means), receiving element (31, 39) and light emitting element 32. This recharges at least the emergency source, one capacitor 33 or more (up to three), or accumulatable batteries such as a nickel-cadmium disk-shaped flat battery or knob cell 30. The charging circuit 35 is also on single chip mounted in SURFACEMOUNT (SMD) technology, as chip 2, and one or more of the sources 30, 33 can also be mounted thereon in SMD technology as on chip 2, or situated in between, if interchangeably held in position there, within the new casing 37. Electrical elements such as capacitor 33, cell 30 and switching means (photothyristor) 34 are of course in electrical connection with circuit board 2 (as shown by darkening at the interface between elements and circuit board, indicating connection in FIG. 1a) and optical elements are in optical connection with light guides 36 etc.

Figure 2:
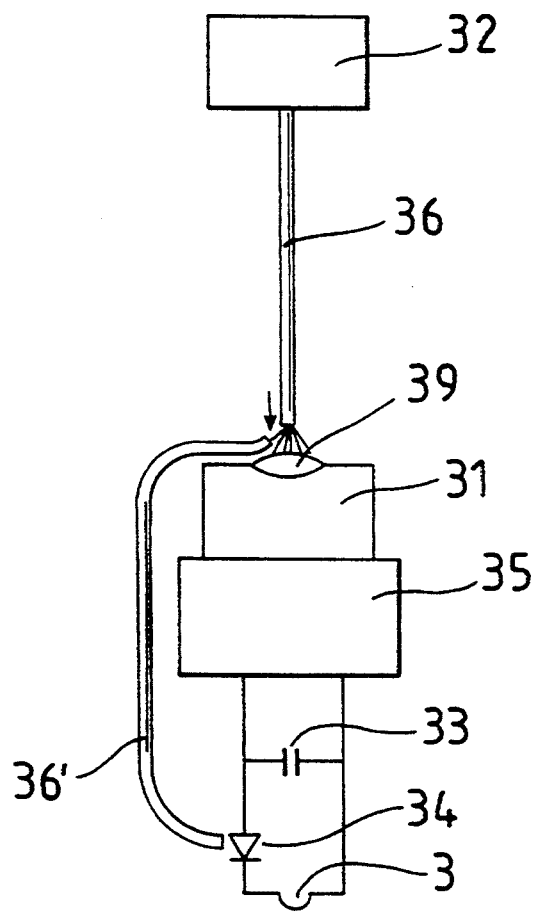
FIG. 2 is a circuit diagram showing the opto-electric triggering means.
Figure 2A:
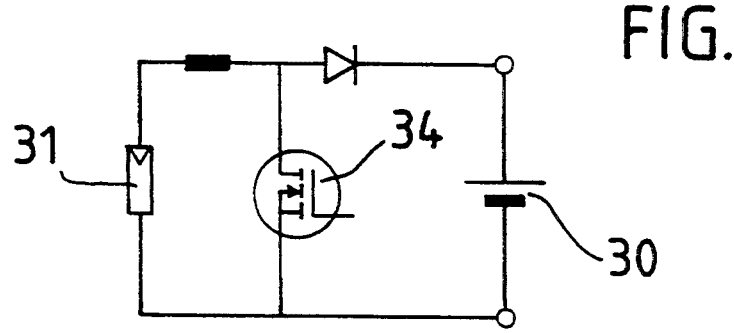
FIG. 2a is a circuit diagram showing the recharging means for one or more energy sources.

In FIG. 2 the lightguiding means and their application is shown more diagrammatically for ease of understanding its functioning. In FIG. 2a there is shown a simplified form of the charging circuit for recharge accumulators, batteries or the like sources as mounted on charging circuit chip 35. Such charging circuit is known per se for a single Nicad cell from a single solar cell as shown in FIG. 2 on page 150 of the german journal "Elektronik" 9/of Apr. 27, 1990.

Figure 4:
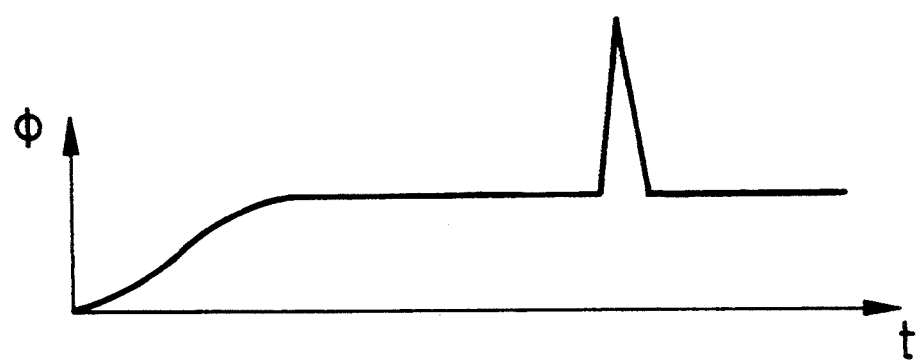
FIG. 4 is an impulse diagram for triggering the igniter.

When a natural (Solar) light source 32' or artificial (laser diode) light source 32 emits its light into photoelectric cell 31 directly or via light guide 36 it is recharging, via charging circuit on chip 35, the source 30, 33. Natural light source 32' provides an additional source of energy. The emitted light of 32 should be either of a vexed broad band to couple out thereof a very narrow wavelengthed light or of one single wavelength for a triggering signal. The laser light source may also be a continuous wave (cw) source. It may also be a pulsed laser electrically controlled by outlet from the electronic sensor circuit on chip 2. The sensor circuit emits a light pulse which is superimposed on the light of the cw-laser, to send out the trigger impulse (and form optical trigger signal means) as shown in FIG. 4. A light guide prolongation 36' leading to the electronic switching means 34 carries the trigger impulse. At switching means 34 a photothyristor, fires the igniter 3, that is by discharging capacitor 33 over a bridge, gap or squib as aforesaid.

Figure 3:
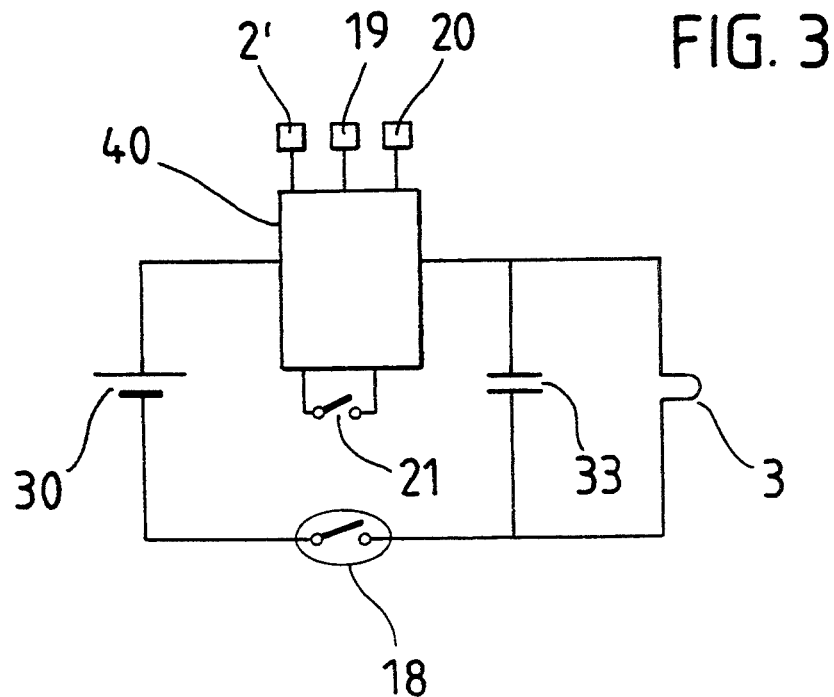
FIG. 3 is a block diagram showing the electronic sensor circuit with several sensors, the signals of which are to be evaluated in the evaluating part of the circuit.

A block diagram of the electronic sensor circuit is depicted in FIG. 3. Most of the sensor circuit of its components are mounted on chip 2 of FIG. 1, including a battery 30 as an electric energy source, an evaluating part 40 of the circuit including the sensors or their input port for sensor signals (analog and/or digital) with electronic means for signal amplification, means for evaluation by comparing it with set thresholds, and electronic delay means such as a flip-flop or others.

The said evaluating part 40 could be [made in analogous or] analogue or in digital form such as a microprocessor.

The sensors can be chosen as acceleration (deceleration) sensor 2' and check sensors 19 and 21 such as seat belt fastened query sensor at 19, seat belt dislocated query sensor or no more head rest query sensor at 20, seat occupied querry sensor at 21 and so on in a check sensing manner known per se.

All functions are checked as above in operation and combined in an AND-gate so that only if all questions are answered and/or set thresholds are reached, a triggering signal is released by electronic switch 18 in FIG. 3 or photo-thyristor 34 is FIG. 2, as to fire igniter 3, p.e. by discharging charged capacitor 33.

While a specific embodiment of the invention has been shown and described in detail to illustrate the application of the principles of the invention, it will be understood that the invention may be embodied otherwise without departing from such principles.

What is claimed is:

1. A vehicle restraint system for protecting passengers against injury in case of a crash, the system including a restraint mechanism activated by an ignitable pyrotechnic or propellant charge, the system comprising:

an electronic sensor circuit including means for generating a restraint system release signal, only upon the occurrence of predetermined conditions, said sensor circuit including an acceleration responsive signal generator for generating a crash event signal as one of said predetermined conditions;

energy supply means, including one of an on-board energy source and an additional source of energy; emergency voltage supply means for supplying said electronic sensor circuit with a voltage at a set voltage value, said set voltage value for providing power to electrically ignite said pyrotechnic or propellant charge upon said electronic sensor circuit generating said restraint system release signal;

opto-electric cell means connected to said energy supply means for holding said emergency voltage supply at said steady state;

optical connection means for optical connection of said energy supply means to said opto-electric cell means and defining a connection from one of said on-board energy source and said additional source of energy to said emergency voltage supply means for holding said emergency voltage supply means in a steady state, said optical connection means including a light emitting element connected to a light receiving element including said opto-electric cell means via light guiding means, said light guiding means including a light guide part for sending a light impulse;

optical trigger signal means associated with said light emitting element for generating a trigger light impulse, said optical trigger signal means being connected to said light guide part; and photoelectric converting means for generating an electric impulse as a signal to activate an igniter, upon receiving said trigger light impulse.

2. A restraint system according to claim 1, wherein:
said electronic sensor circuit is provided on a chip and is encapsulated to form a sensor housing which makes contact with a second housing defining a gas generator, at a contact position;
an electrically triggerable igniting means, formed by one of an igniting mixture and a primer is encapsulated with said chip to form part of said sensor housing, said electrically triggerable igniting means being positioned adjacent said contact position for initiating gas generation in a pyrotechnic or propellant charge in the gas generator, solely at the proper timepoint of activation; and
an opto-electric unit including said opto-electric cell means, said optical connection means and said photoelectric converting means is positioned in said sensor housing.

3. A restraint system according to claim 1, wherein:
said energy supply means additional source of energy is solar energy, said sensor housing having a window to receive light through said window, said opto-electric cell means being positioned adjacent said window.

4. A restraint system according to claim 1, wherein electromagnetically shielding is provided in encapsulating said electronic sensor circuit.

5. A vehicle restraint system for protecting passengers against injury in case of a crash, the system including a restraint mechanism activated by an ignitable pyrotechnic or propellant charge, the system comprising:

an electronic sensor circuit including means for generating a restraint system release signal, only upon the occurrence of predetermined conditions, said sensor circuit including an acceleration responsive signal generator for generating a crash event signal as one of said predetermined conditions;

energy supply means, including an on-board energy source and another source of energy;

emergency voltage supply means for supplying said electronic sensor circuit with a voltage at a set voltage value, said set voltage value for providing power to electrically ignite said pyrotechnic or propellant charge upon said electronic sensor circuit generating said restraint system release signal;

opto-electric cell means connected to said energy supply means for holding said emergency voltage supply at a steady state;

optical connection means for optical connection of said energy supply means to said opto-electric cell means and defining a connection from one of said on-board energy source and said additional source of energy to said emergency voltage supply means for holding said emergency voltage supply means in said steady state, said optical connection means including a light emitting element connected to a said opto-electric cell means via light guiding means, said light guiding means including a light guide part for sending a light impulse;

said light emitting element including optical trigger signal means, for generating a trigger light impulse, upon said electronic sensor circuit generating said restraint system release signal, said optical trigger signal means being connected to said light guide part; and photoelectric converting means for generating an electric impulse based on said set voltage level of said emergency voltage supply to activate an igniter, upon receiving said trigger light impulse.

6. A restraint system according to claim 5, wherein said photoelectric converting means is a photothyristor.

7. A restraint system according to claim 5, wherein one or more light emitting elements are used with a first light emitting element having a broad spectral range to couple out light of a special wavelength.

8. A restraint system according to claim 5, wherein said emergency voltage supply is a chargeable and dischargeable capacitor, connected in parallel with said igniter.

9. A restraint system according to claim 8, wherein a solar cell is an opto-electric cell means and is used to charge the capacitor.

10. A restraint system according to claim 5, wherein said trigger light impulse is generated by a pulsed laser and is transmitted via said light guiding means to said photoelectric converting means.

11. A restraint system according to claim 5, wherein:
said electronic sensor circuit is provided on a chip and is encapsulated to form a sensor housing which makes contact with a second housing defining a gas generator, at a contact position;
an electrically triggerable igniting means, formed by one of an igniting mixture and a primer is encapsulated with said chip to form part of said sensor housing, said electrically triggerable igniting means being positioned adjacent said contact position for initiating gas generation in a pyrotechnic or propellant charge in the gas generator, solely at the proper timepoint of activation; and
an opto-electric unit including said opto-electric cell means, said optical connection means and said photoelectric converting means is positioned in said sensor housing.

12. A restraint system according to claim 11, wherein said trigger light impulse is generated by a pulsed laser and is transmitted via said light guiding means to said photoelectric converting means.

13. A restraint system according to claim 5, wherein:
said energy supply means another source of energy is solar energy, said sensor housing having a window to receive light through said window, said optoelectric cell means being positioned adjacent said window.

14. A restraint system according to claim 5, further comprising an additional light emitting element, said light emitting element and said additional light emitting element being provided as a continuous wave light emitter and a pulsed light emitter respectively.

15. A restraint system according to claim 14, wherein said pulsed light emitter is a pulsed laser light source.

* * * * *